March 23, 1943.  H. C. SPECHT  2,314,665
TOOL HOLDER
Filed Sept. 16, 1940
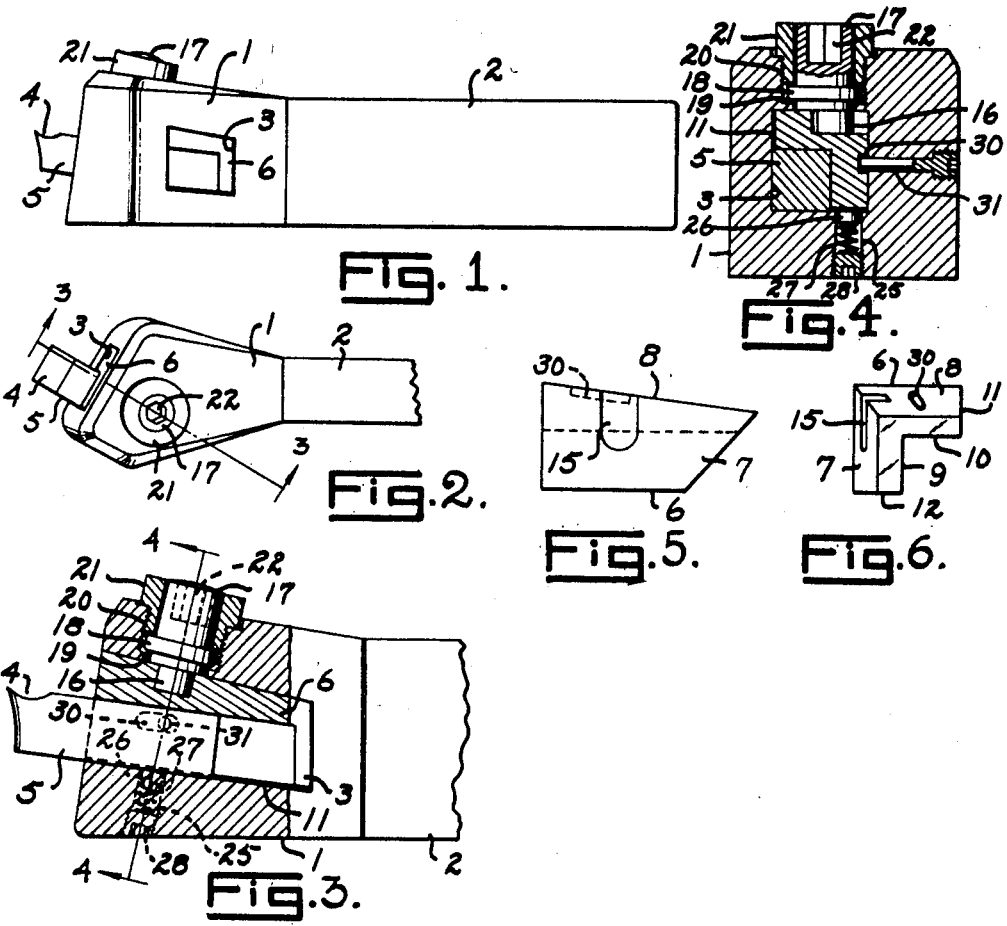
HERMAN C. SPECHT
INVENTOR.
BY Lester B. Clark
ATTORNEY.

Patented Mar. 23, 1943

2,314,665

UNITED STATES PATENT OFFICE 2,314,665

TOOL HOLDER

Herman C. Specht, Houston, Tex.

Application September 16, 1940, Serial No. 356,927

3 Claims. (Cl. 29—100)

This invention relates to tool holders for machine tools such as are used in lathes, planers, boring and milling machines and the like and is designed for general use for desirably holding cutting tools in machine work.

The primary object of the invention is to provide a novel device of the class described which is inexpensive to construct and maintain and which is so constructed as to easily and effectively receive and hold a tool in cutting position.

Another object is to provide a tool holder having an inwardly tapered opening in which is positioned a tapered block having surfaces which cooperate with the surfaces of the opening to produce a real engagement with the cutter tool to be held thereby.

Another object is to provide a tool holder of such construction that the stress set up by the normal use of a tool held therein enhances the engagement with holding of such tool in cutting position.

Still another object is to provide a holder of the class described with manually operable means for moving the tapered block or wedge to and from engagement with the cutter tool.

A further object is to provide means for resiliently holding the wedge block in position so that a cutting tool may be easily inserted when a manually operable clamping means is moved to released position.

The foregoing objects are primary objects and will, together with other objects, be more fully apparent from the following description of illustrative embodiments of the invention which is illustrated in the accompanying drawing in which:

Fig. 1 is a side view of a tool holder embodying the invention;

Fig. 2 is a partial plane view of the construction shown in Fig. 1;

Fig. 3 is a sectional view taken on line 3—3 in Fig. 2;

Fig. 4 is a sectional view taken on line 4—4 in Fig. 3;

Figs. 5 and 6 are side and end views respectively of the wedge block constituting an element of the invention.

The invention in accordance with the illustrated embodiments of the drawing comprises a holder including a body 1 having a shank 2, it being understood that such holder may be a lathe tool holder, a boring tool holder, a milling tool or other holder for cutter tools. The body 1 has an opening 3 therein, such opening tapering inwardly from the cutting end 4 of the cutter tool 5.

Slidable within the opening 3 is an L-shaped wedge block 6 having outer surfaces 7 and 8 and inner surfaces 9 and 10 as best seen in Figs. 5 and 6. The inner surfaces 9 and 10 may be considered as resulting from the cutting away of material from a wedge shaped block of generally rectangular cross section and it is to be understood that these surfaces are of such areal extent as to be substantially coextensive with the adjacent faces of the cutter tool 5 and also that a plurality of interchangeable wedge blocks will be provided so that cutter tools of different sizes may be received and held within the body 1.

Referring to Figs. 3 and 4 it will be noted that the cutter tool 5 rests in one corner of the opening 3 and that the outwardly facing edges 11 and 12 of the wedge block are slightly spaced from the inner walls of the opening 3. This clearance enables engagement of the cutter tool 5 throughout substantially its entire surface and at the same time allows for increased wedging action and wear of the tool holder and the tool.

The surface 7 of the wedge block 6 is provided with a groove 15 of such dimension as to slidably receive a cylindrical projection 16 which extends eccentrically outward from the end of a cylindrical cam member 17. This cam member has a flange 18 adjacent its lower end adapted to engage a shoulder 19 within the passage 20 in the body 1. The passage 20 threadedly receives a collar 21 which serves as a journal for the cam member 17.

In assembling and using the construction thus far described the collar 21 and cam member 17 are initially removed from within the passage 20. A wedge block 6 of suitable size is inserted within the opening 3 and the cam member 17 is inserted into the passage 20 and secured in place with the projection 16 extending into the cam groove 15. It seems apparent that rotation of the cam member 17 as by means of a bar inserted into the polygonal socket 22 at the upper end of the member will cause the wedge block 6 to move inwardly or outwardly within the opening depending upon the direction of rotation of the cam member.

In order to facilitate the insertion of the cutter tool 5 into the aperture formed by the opening 3 and the wedge block 6 a hole 25 is drilled through the lower wall of the body 1. A cylindrical member 26 is positioned within the hole 25 and is constantly urged into resilient engagement with the wedge block 6 by a spring 27 held under adjustable compression by means of a plug 28 in the lower end of the hole. By means of this construction the block 6 is constantly urged upwardly and hence toward a position whereby the cutter tool 5 may be readily inserted within the aperture provided therefor.

In order to limit the outward movement of the wedge block 6 under the influence of the cam member 17 an elongated slot 30 is provided in the face 8 of the block 6. A stop pin 31 is secured in a threaded hole in the side of the body 1 and enters such slot. This slot is of such length that the block 6 is stopped in its forward movement before the cam member 17 passes its central position and initiates the return movement of the block by its continued rotation. The slot 30, however, is of such length that the pin 31 does not restrict the rearward or clamping movement of the wedge block 6.

It may be pointed out that a highly desirable favor resides in the fact that the tool 5 is engaged throughout a considerable area and in this manner the cutter tool 5 is securely held against movement and at the same time is little effected by the frictional engagement with the clamping members. It should also be noted that the construction is such that forces set up by the cutting of the tool 5 tend to enhance the engagement of the tool by the holder.

Broadly the invention comprehends the provision of a novel tool holder which is simple and inexpensive to construct and maintain and which is highly efficient in desirably holding a cutter tool in cutting position.

What is claimed is:

1. In a combination, a body having an inwardly tapering rectangular opening therein, an L-shaped wedge block within said opening, a cam groove in said wedge block, a passage through the wall of the body from said opening, there being an outwardly facing shoulder in said passage, a cylindrical cam member in said passage, a flange on said member adapted to engage the shoulder in the passage, a collar surrounding the cam member and threadably secured within the passage, an eccentric projection on the inner end of the cam member extending into said groove, means resiliently urging the wedge block towards said cam member and a stop pin in the wall of the body for limiting the outward movement of the wedge block by the cam member.

2. A tool holder for machines comprising, a body having an inwardly tapering opening therein, a wedge block in said opening, said wedge block having a cutaway portion so that the surface formed thereby is opposed to a surface within the opening and provides an aperture to receive a cutter tool, a cam groove in said wedge block, a passage through the wall of the body from said opening, there being an outwardly facing shoulder in said passage, a cylindrical cam member in said passage, a flange on said member adapted to engage the shoulder in the passage, a collar surrounding the cam member and threadably secured within the passage, and an eccentric projection on the inner end of the cam member extending into said groove.

3. A tool holder for machines comprising, a body having an inwardly tapering opening therein, a wedge block in said opening and forming with the walls of the opening an aperture adapted to receive a cutter tool, a cam groove in said wedge block, a cam member rotatably mounted in the body in the wall of said opening, an eccentric projection on said member extending into said cam slot whereby the wedge block is moved longitudinally of the opening by angular movement of the cam member, and means including a slot in the outer surface of said block and a removable pin extending into the tapered opening and entering said slot for limiting the outward movement of the wedge block by said cam member.

HERMAN C. SPECHT.